United States Patent
Shahidzadeh et al.

(10) Patent No.: US 6,349,380 B1
(45) Date of Patent: Feb. 19, 2002

(54) LINEAR ADDRESS EXTENSION AND MAPPING TO PHYSICAL MEMORY USING 4 AND 8 BYTE PAGE TABLE ENTRIES IN A 32-BIT MICROPROCESSOR

(75) Inventors: Shahrokh Shahidzadeh, Beaverton; Bryant E. Bigbee, Aloha; David B. Papworth, Beaverton; Frank Binns, Hillsboro; Robert P. Colwell, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/267,796

(22) Filed: Mar. 12, 1999

(51) Int. Cl.[7] .......................... G06F 9/355; G06F 9/34; G06F 12/10; G06F 12/06; G06F 12/08

(52) U.S. Cl. ...................... 712/211; 712/208; 711/205; 711/206; 711/207; 711/208; 711/209

(58) Field of Search .............................. 712/1, 41, 43, 712/200, 208, 209, 211, 113; 711/1, 2, 5, 202, 203, 206, 207, 208, 209, 211, 212, 220, 205, 201, 204, 215, 221, 213, 216, 214

(56) References Cited

U.S. PATENT DOCUMENTS

| | | | |
|---|---|---|---|
| 4,679,140 A | | 7/1987 | Gotou et al. ................. 364/200 |
| 4,796,177 A | * | 1/1989 | Nishimura et al. ............. 711/2 |
| 5,249,280 A | * | 9/1993 | Nash et al. ..................... 711/5 |
| 5,566,308 A | | 10/1996 | Bendelac et al. ........... 395/402 |
| 5,612,911 A | * | 3/1997 | Timko ......................... 708/670 |
| 5,617,554 A | * | 4/1997 | Alpert et al. ................ 711/208 |
| 5,664,139 A | * | 9/1997 | Spurlock .................... 711/202 |
| 5,960,466 A | * | 9/1999 | Belgard ....................... 711/213 |
| 5,963,984 A | * | 10/1999 | Garibay, Jr. et al. ........ 711/206 |
| 5,974,520 A | * | 10/1999 | Huang ......................... 711/206 |
| 6,009,510 A | * | 12/1999 | Henry ......................... 712/204 |
| 6,108,773 A | * | 8/2000 | Col et al. .................... 712/237 |

FOREIGN PATENT DOCUMENTS

EP 0530682 A1 8/1992

OTHER PUBLICATIONS

C. Ray Peng, et al., "The Power Architecture TM: 64–Bit Power With 32–Bit Compatibility", Digest Of Papers Of The Computer Society Computer Conference, pp. 300–307.

* cited by examiner

Primary Examiner—Daniel H. Pan
(74) Attorney, Agent, or Firm—Seth Z. Kalson

(57) ABSTRACT

A microprocessor for providing an extended linear address of more than 32 bits. The extended linear address may be provided by concatenating a linear address with a segment selector extension, or by concatenating the values from two registers. Hierarchical translation of a linear address to a physical address is performed in which the number of levels in the hierarchy depends upon whether the linear address is an extended linear address.

18 Claims, 15 Drawing Sheets

MODE C (2MB PAGING)

LINEAR ADDRESS EXTENSION AND MAPPING TO PHYSICAL MEMORY USING 4 AND 8 BYTE PAGE TABLE ENTRIES IN A 32-BIT MICROPROCESSOR

FIELD

The present invention relates to microprocessor and computer systems, and more particularly, to virtual memory systems with extended linear address generation and translation.

BACKGROUND

Most microprocessors make use of virtual or demand-paged memory schemes, where sections of a program's execution environment are mapped into physical memory as needed. Virtual memory schemes allow the use of physical memory much smaller in size than the linear address space of the microprocessor, and also provide a mechanism for memory protection so that multiple tasks (programs) sharing the same physical memory do not adversely interfere with each other.

Physical memory is part of a memory hierarchy system, which may be illustrated as part of a computer system shown in FIG. 1. Microprocessor 102 has a first level cache comprising instruction cache 104 and data cache 106. Microprocessor 102 communicates with unified second level cache 108 via backside bus 110. Second level cache 108 contains both instructions and data, and may physically reside on the chip die 102. Caches 104 and 106 comprise the first level of the memory hierarchy, and cache 108 comprises the second level.

The third level of memory hierarchy for the exemplary computer system of FIG. 1 is indicated by memory 112. Microprocessor 102 communicates with memory 112 via host processor (front side) bus 114 and chipset 116. Chipset 116 may also provide graphics bus 118 for communication with graphics processor 120, and serves as a bridge to other busses, such as peripheral component bus 122. Secondary storage, such as disk unit 124, provides yet another level in the memory hierarchy.

FIG. 2 illustrates some of the functional units within microprocessor 102, including the instruction and data caches. In microprocessor 102, fetch unit 202 fetches instructions from instruction cache 104, and decode unit 206 decodes these instructions. For a CISC (Complex Instruction Set Computer) architecture, decode unit 206 decodes a complex instruction into one or more micro-instructions. Usually, these micro-instructions define a load-store type architecture, so that micro-instructions involving memory operations are simple load or store operations. However, the present invention may be practiced for other architectures, such as for example RISC (Reduced Instruction Set Computer) or VLIW (Very Large Instruction Word) architectures.

For a RISC architecture, instructions are not decoded into micro-instructions. Because the present invention may be practiced for RISC architectures as well as CISC architectures, we shall not make a distinction between instructions and micro-instructions unless otherwise stated, and will simply refer to these as instructions.

Most instructions operate on several source operands and generate results. They name, either explicitly or through an indirection, the source and destination locations where values are read from or written to. A name may be either a logical (architectural) register or a location in memory.

Renaming logical registers as physical registers may allow instructions to be executed out of order. In FIG. 2, register renaming is performed by renamer unit 208, where RAT (Register Allocation Table) 210 stores current mappings between logical registers and physical registers. The physical registers are indicated by register file 212.

Every logical register has a mapping to a physical register in physical register file 212, where the mapping is stored in RAT 210 as an entry. An entry in RAT 210 is indexed by a logical register and contains a pointer to a physical register in physical register file 212. Some registers in physical register file 212 may be dedicated for integers whereas others may be dedicated for floating point numbers, but for simplicity these distinctions are not indicated in FIG. 2.

During renaming of an instruction, the current RAT provides the required mapping for renaming the source logical register(s) of the instruction, and a new mapping is created for the destination logical register of the instruction. This new mapping evicts the old mapping in the RAT.

Renamed instructions are placed in instruction window buffer 216. All instructions "in-flight" have an entry in instruction window buffer 216, which operates as a circular buffer. Instruction window buffer 216 allows for memory disambiguation so that memory references are made correctly, and allows for instruction retirement in original program order. (For CISC architectures, a complex instruction is retired when all micro-instructions making up the complex instruction are retired together.)

For an instruction that writes its result to a memory location, data cache 106 (part of the memory hierarchy) is updated upon instruction retirement. For an instruction that writes its result to a logical register, no write need be done upon retirement because there are no registers dedicated as logical registers. (Physical register file 212 has the result of the retiring instruction in that physical register which the destination logical register was mapped to when the instruction was renamed.)

Scheduler 218 schedules instructions to execution units 220 for execution. For simplicity, only memory execution unit 224 is explicitly indicated in execution units 220. A load or store instruction is dispatched by scheduler 218 to AGU (Address Generation Unit) 222 for computation of a linear address, and memory execution unit 224 translates the linear address into a physical address and executes the load or store instruction. Memory execution unit may send data to or receive data from a forwarding buffer (not shown) rather than data cache 106, where a forwarding buffer stores objects that may eventually be written to data cache 106 upon instruction retirement. The scheduling function performed by scheduler 218 may, for example, be realized by reservation stations (not shown) implementing Tomasulo's algorithm (or variations thereof) or by a scoreboard. Execution units 220 may retrieve data from or send data to register file 212, depending upon the instruction to be executed.

In other embodiments of the present invention, the information content contained in the data structures of physical register field 212 and instruction window buffer 216 may be realized by different functional units. For example, a re-order buffer may replace instruction window buffer 216 and physical register file 212, so that results are stored in the re-order buffer, and in addition, registers in a register file are dedicated as logical registers. For this type of embodiment, the result of an instruction that writes to a logical register is written to a logical register upon instruction retirement.

With most modern computer systems, a microprocessor refers to a memory location by generating a linear address, but an object is retrieved from a specific memory location by providing its physical address on an address bus, such as bus 114 in FIG. 1. Linear addresses may be the same as physical addresses, in which case address translation is not required. However, usually a virtual memory scheme is employed in which linear addresses are translated into physical addresses. In this case, a linear address may also be referred to as a virtual address. The linear address space is the set of all linear addresses generated by a microprocessor, whereas the physical address space is the set of all physical addresses.

For some microprocessor architectures, such as Intel® Architecture 32 bit (IA-32) microprocessors (Intel® is a registered trademark of Intel Corporation, Santa Clara, Calif.), there is also another type of address translation in which a logical address is translated into a linear address. For these type of architectures, the instructions provide logical address offsets, which are then translated to linear addresses by AGU 222 in FIG. 2. This extra stage of address translation may provide additional security, e.g., where application code cannot modify supervisory (operating system) code.

The mapping of a logical address to a linear address is illustrated in FIG. 3. A logical address comprises segment selector 302a and offset 304. Segment selector 302a is stored in segment register 302, which also contains descriptor cache 302b. Segment selector 302a points to segment descriptor 308 in descriptor table 306. Descriptor table 306 provides a table of segment descriptors stored in memory. A segment descriptor provides a segment base address, so that a linear address is obtained by adding an offset to the base address provided by a segment descriptor, as indicated by summation 312. In addition to providing a base address, a segment descriptor contains various other types of information, such as access rights and segment size. The base address, access rights, segment size, and other information, is cached in descriptor cache 302b.

A virtual or demand-paged memory system may be illustrated as a mapping between a linear (virtual) address space and a physical address space, as shown in FIG. 4. In a virtual memory system, the linear and physical address spaces are divided into blocks of contiguous addresses, customarily referred to as pages if they are of constant size or are any of several fixed sizes. A typical page size may be 4KBytes, for example.

The mapping shown in FIG. 4 illustrates a generic two-level hierarchical mapping comprising directory tables and page tables. Page directory tables and page tables are stored in physical memory, and are usually themselves equal in size to a page. A page directory table entry (PDE) points to a page table in physical memory, and a page table entry (PTE) points to a page in physical memory. For the two-level hierarchical mapping of FIG. 4, a linear address comprises directory field 402, table field 404, and offset field 406. A directory field is an offset to a PDE, a table field is an offset to a PTE, and an offset field is an offset to a memory location in a page.

In FIG. 4, page directory base register (PDBR) 408 points to the base address of page directory 410, and the value stored in directory field 402 is added to the value stored in PDBR 408 to provide the physical address of PDE 412 in page directory 410. PDE 412 in turn points to the base address of page table 414, which is added to the value stored in table field 404 to point to PTE 416 in page table 414. PTE 416 points to the base address of page 418, and this page base address is added to the value stored in offset 406 to provide physical address 420. Linear address 422 is thereby mapped to physical address 420.

Accessing entries stored in page directories and page tables require memory bus transactions, which can be costly in terms of processor cycle time. However, because of the principle of locality, the number of memory bus transactions may be reduced by storing recent mappings between linear and physical addresses in a cache, called a translation look-aside buffer (TLB). There may be separate TLBs for instruction addresses and data addresses. Entries in a TLB are indexed by linear addresses. A hit in a TLB provides the physical address associated with a linear address. If there is a miss, then the memory hierarchy is accessed, sometimes referred to as a page walk, as indicated in FIG. 4 to obtain the translation of a linear address into a physical address.

Some IA-32 microprocessors employ several modes for translating linear addresses into physical addresses, and we shall consider three such modes herein referred to as modes A, B, and C. Mode A supports a 32 bit physical address space with 4 KB page sizes. Mode B supports a 32 bit physical address space with either 4 KB or 4 MB page sizes. For modes A and B, the page and directory table entries are each 4 bytes. Mode C supports a 36 bit physical address space for a physical address size of 64 GB (physical address extension) with either 4 KB or 2 MB page sizes. For mode C, the page and directory table entries are each 8 bytes. For each mode, the page and directory tables are equal in size to a page. All modes are for translating 32 bit linear addresses.

Mode A is illustrated in FIG. 5, where the first 12 bits of a linear address are used as an offset to a physical address within a page frame, the next 10 bits of the linear address are used as an offset into a page table, and the highest 10 bits of the linear address are used as an offset into a page directory. For example, in FIG. 5, PTE 502 in page table 504 pointed to by table field 506 of the linear address provides the address of the desired page frame in physical memory, and when concatenated with offset 508 of the linear address provides the physical address of the desired object. The PDBR register, page directory entries, and page table entries each provide the upper 20 bits of a 32 bit address, so that page directories, page tables, and pages are each forced to be aligned on 4 KB boundaries.

Mode B for 4 MB page sizes is illustrated in FIG. 6. (For 4 KB page sizes, mode B is similar to mode A. The first 22 bits of the linear address provides the offset into a physical 4 MB page frame, and the highest 10 bits of the linear address provides the offset into a page table. Note that mode B with 4 MB page sizes requires only one level of address translation. A PDE in the page directory of FIG. 6 provides the upper 10 bits of a 32 bit address to force pages to be aligned on 4 MB boundaries.

Mode C for 4 KB page sizes is illustrated in FIG. 7. This involves a third level of address translation provided by page directory pointer table (PDPT) 702. Each entry in PDPT 702 is 8 bytes, and there are 4 entries in a PDPT. PDBR 704 provides the upper 27 bits of a 32 bit address pointing to the base of a PDPT so that PDPTs are forced to be aligned on 32 byte boundaries. Each entry in the PDPT, page directory, and page table provides the upper 24 bits of a 36 bit address so that page directories, page tables, and pages are forced to be aligned on 4 KB boundaries.

Mode C for 2 MB page sizes is illustrated in FIG. 8. Only two levels of address translation are required, where again a four entry PDPT is used to point to a page directory. Entries in the page directory provide the upper 15 bits of a 36 bit address so that pages are forced to be aligned on 2 MB boundaries.

The page structure described in FIGS. 7 and 8 for Mode C allows up to 4 GB of the 64 GB extended address space to be addressed at one time. To address other 4 GB sections of the extended address space, a different entry may be placed in the PDBR register so as to point to a different PDPT, or entries in the PDPT may be changed. Further details of address translation for the IA-32 architecture may be found in the Intel Architecture Developer's Manual for the Pentium® Pro, Vol. 3, available from Intel Corporation. (Pentium® Pro is a registered trademark of Intel Corporation.)

Increasing the linear address space of a microprocessor provides larger user and system space and reduces the burden associated with linear address exhaustion for a larger physical address space. Increasing the word size of a microprocessor, e.g., from 32 bits to 64 bits, to provide a larger linear address space is a major engineering design task. It may therefore be of economic utility to increase the linear address space of an existing microprocessor design without increasing its word size. Furthermore, it may be advantageous for a microprocessor with increased linear address space to be backward compatible with code designed for the original sized linear address space and supported paging structures.

DETAILED DESCRIPTION OF EMBODIMENTS

Embodiments of the present invention provide for a backward compatible, extended linear address space by utilizing one or more opcodes to indicate when extended linear addressing is to be utilized. In one embodiment, an opcode indicates whether an LAE (Linear Address Extension) bit in a microprocessor register is to be set. If the LAE bit is set, then AGU 222 translates logical addresses to extended linear addresses.

Figure 9:
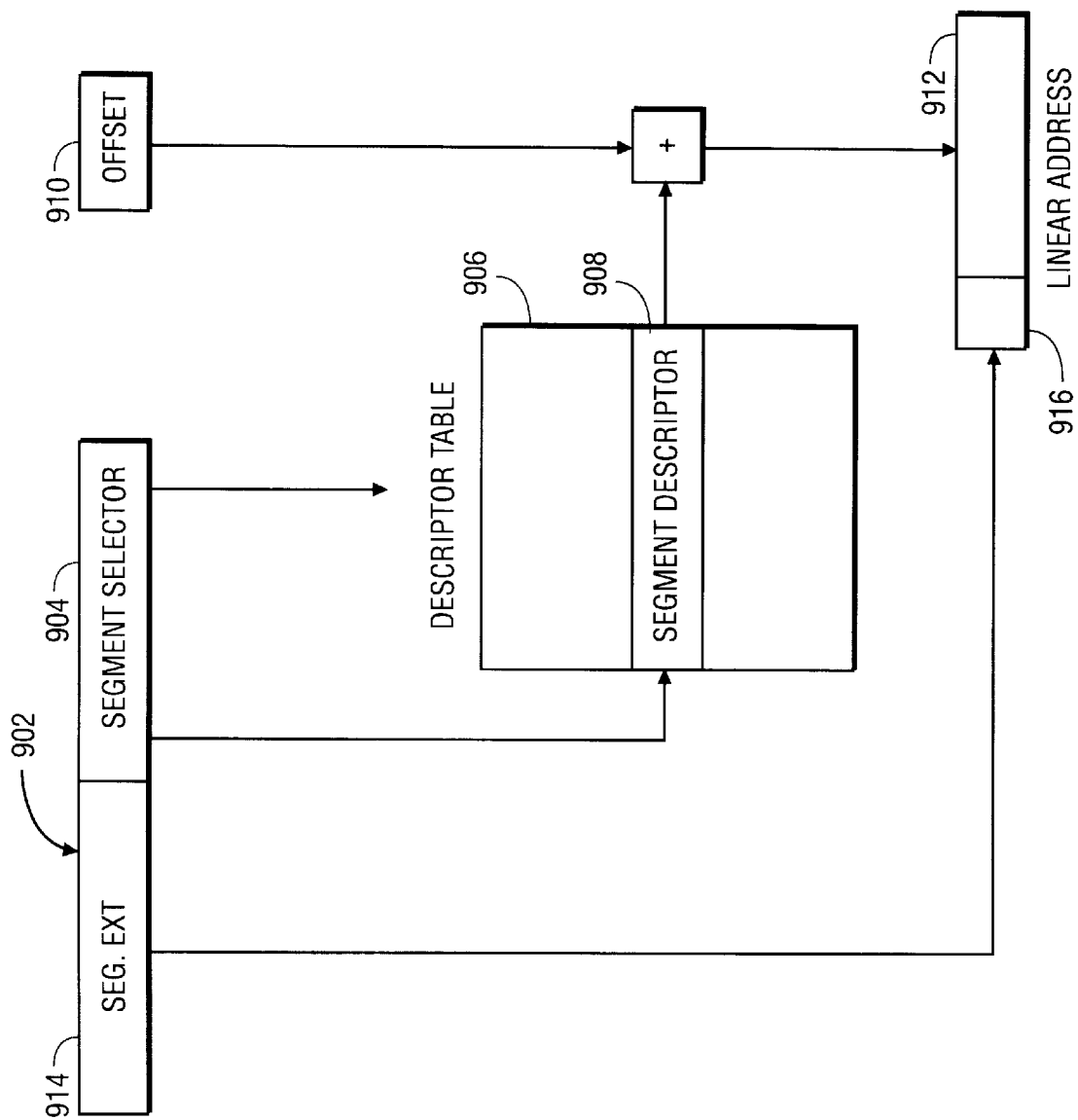
FIG. 9 provides an exemplary embodiment for providing an extended linear address.

FIG. 9 illustrates an embodiment for translating logical addresses to extended linear addresses. Segment register 902 is extended beyond that which is required to select a segment descriptor, as seen in FIG. 9. A portion of segment register 902, denoted by segment selector 904, is used to select descriptor table 906 and segment descriptor 908 so as to provide a base address as discussed previously, and an offset value in offset register 910 is added to the base address to provide a lower portion of the extended linear address, indicated by 912. A portion of segment register 902 not used to select segment descriptor 908, denoted by segment extension 914, forms the upper portion of the extended linear address, denoted by 916. When 914 is added or concatenated with lower portion linear address 912, the extended linear address is obtained.

In another embodiment, instructions provide the extended linear address via their source registers, where the extended linear address is obtained by concatenating the values stored in the source registers. For example, a new instructions for loading, storing, adding, and exchanging objects in memory may be introduced in the instruction set. These new instructions are decoded by decoder 206 into one or more microinstructions, where a microinstruction specifies an extended linear address via source registers in its opcode.

Figure 10:
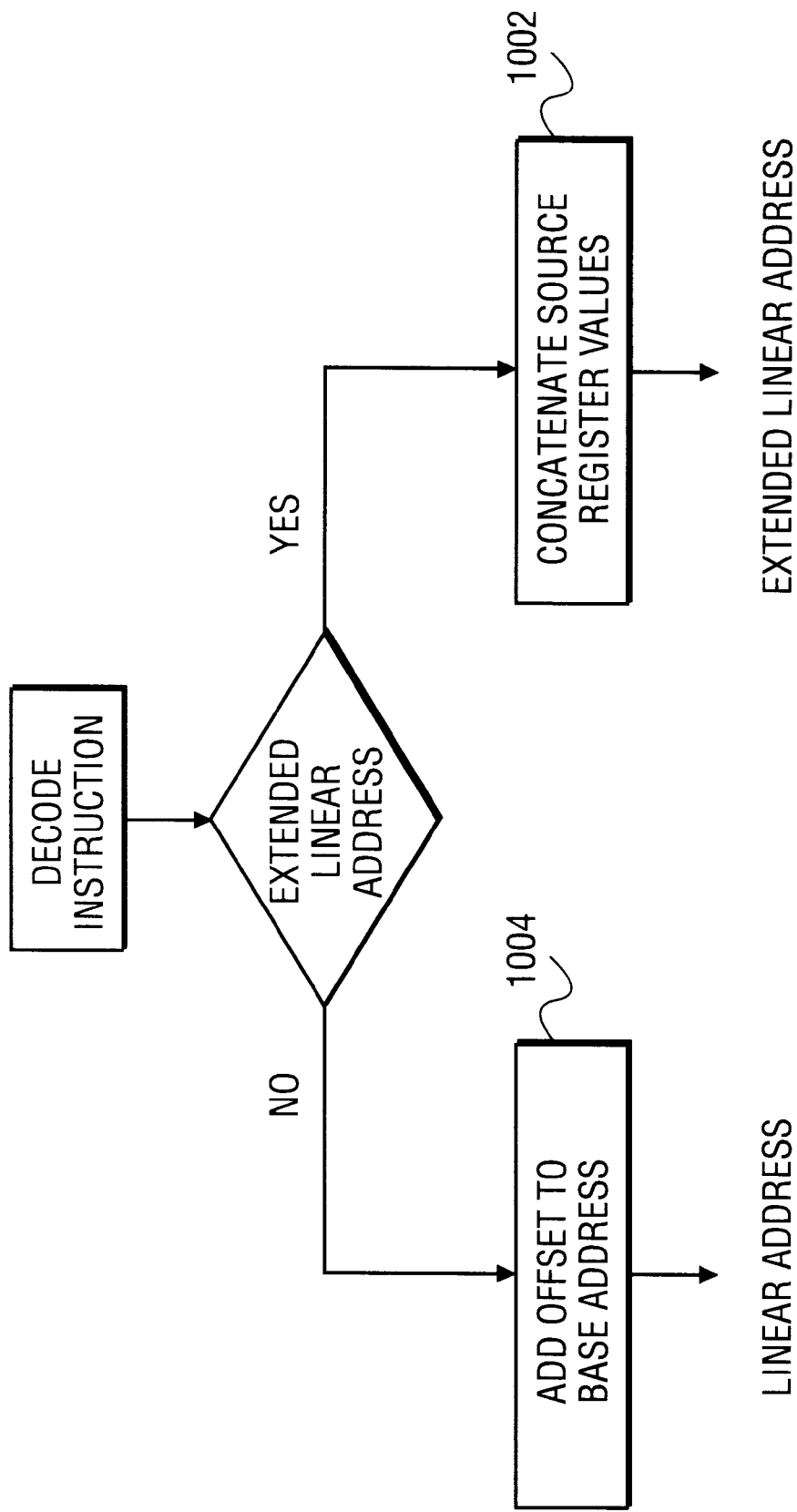
FIG. 10 provides another exemplary embodiment for providing an extended linear address.

This procedure is illustrated in the flow diagram of FIG. 10. In step 1002, the values in the source register named by the decoded instruction are concatenated to form the extended linear address, provided the decoded instruction is an instruction that belongs to the set of instructions operating in the extended linear address space. In step 1004, when a decoded instruction is to operate in the original linear address space, then the offset provided by the instruction is added to the base address provided by the segment descriptor to obtain the linear address.

Figure 10A:
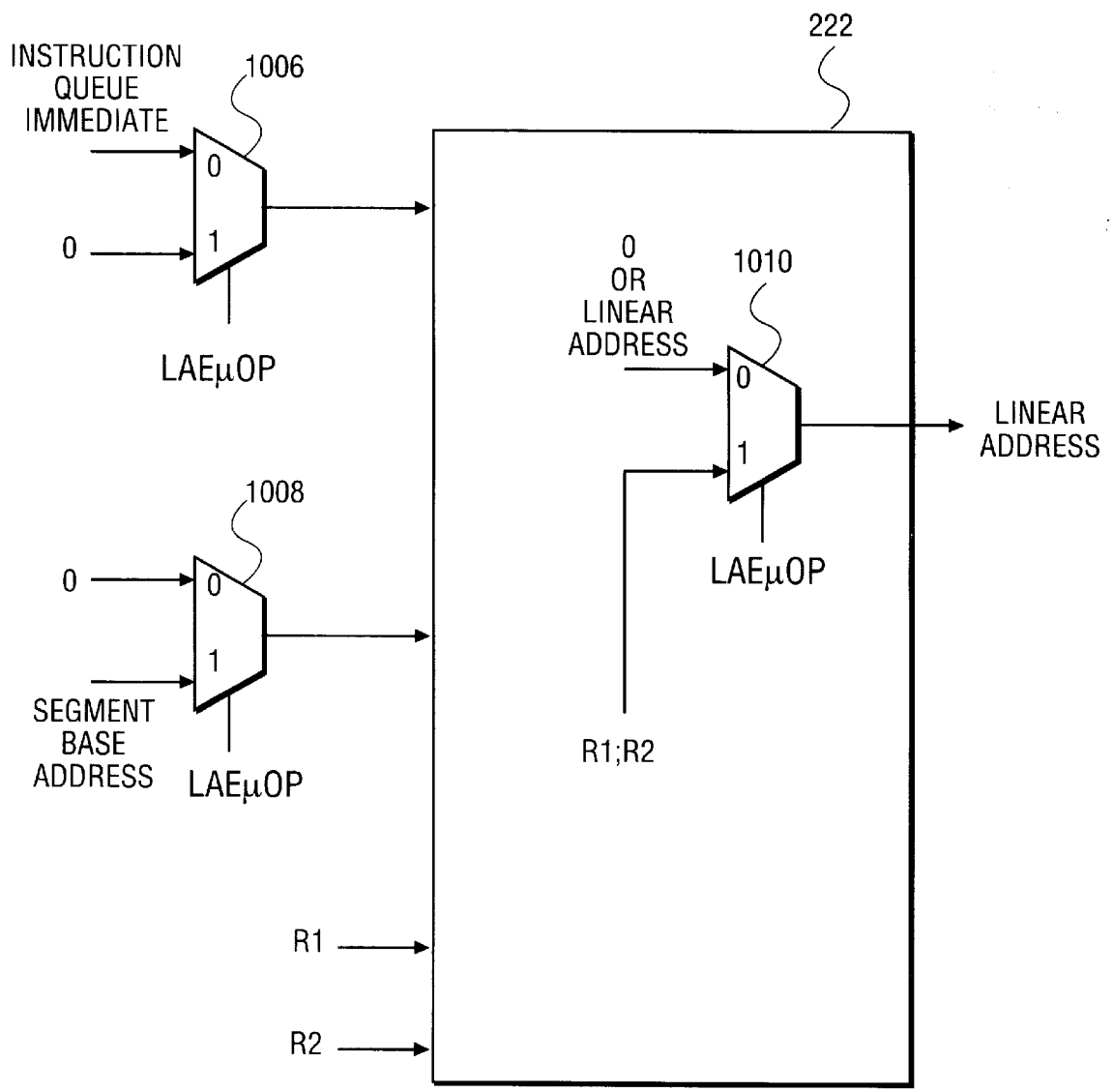
FIG. 10a provides an exemplary implementation of FIG. 10.

FIG. 10a provides an implementation of FIG. 10. Multiplexers 1006, 1008, and 1010 select their inputs based upon whether there is an extended linear address microinstruction (LAEuop line is asserted). If the LAEuop line is not asserted, multiplexers 1006 and 1008 provide to AGU 222 an instruction queue immediate and segment base address, respectively, so that the linear address may be computed in a conventional manner. If, however, LAEuop is asserted, then multiplexer 1010 provides the concatenation of the contents of registers R1 and R2 so that an extended linear address is obtained.

Once an extended linear address is generated, it is translated to a physical linear address. Embodiments of the present invention provide for this address translation by introducing an extra level of translation into the address translation hierarchy, where this extra level of translation is conditionally utilized provided extended linear addressing is indicated.

Figure 11:
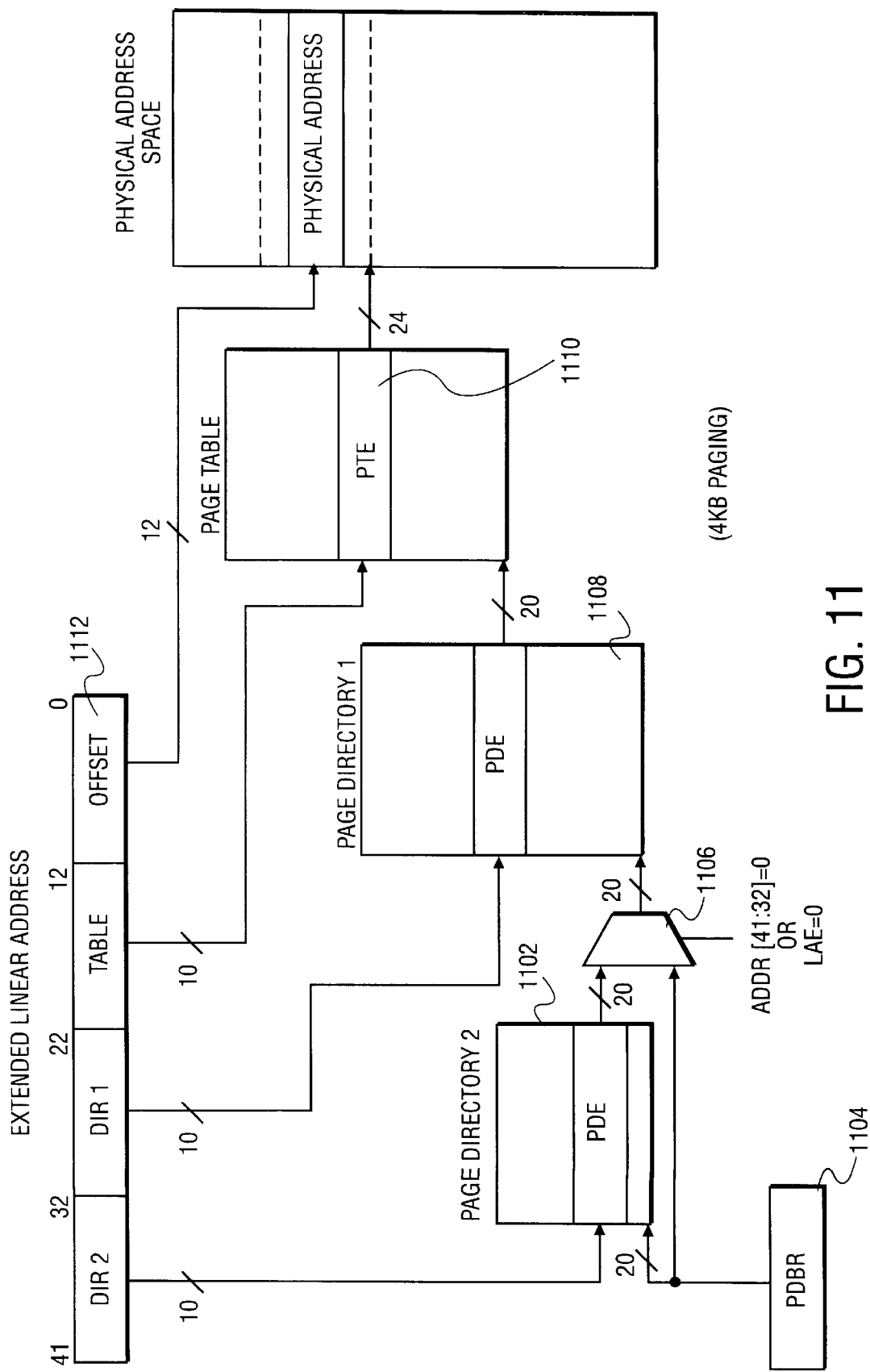
FIG. 11 provides an exemplary embodiment for translating a 42 bit linear address to a 36 bit physical address with 4-KByte paging and 4 byte entries.

FIG. 11 illustrates an embodiment for extended linear address translation with 4 KB paging. In the specific example of FIG. 11, an extended linear address is 42 bits, where the highest 10 bits are used as an offset into page directory 1102. The base address for page directory 1102 is provided by PDBR 1104. Mux (multiplexer) 1106 is used symbolically in FIG. 11 to indicate that if extended linear addressing is indicated, then the PDE provided by page directory 1102 is used as the base address for the next lower level of address translation, which is page directory 1108. Extended linear addressing may be indicated, for example, if an LAE bit is set or if not all of the upper 10 bits of the linear address are zero. If extended linear addressing is not supported, then mux 1106 symbolically indicates that PDBR 1104 is used to point to the base address of page directory 1108. Directory and page table entries are each 4 bytes. PTE 1110 provides the upper 24 bits of a 36 physical address, which when concatenated with 12 bits from offset 1112 provides a 36 bit address. The physical address space is 64-GBytes.

Figure 12:
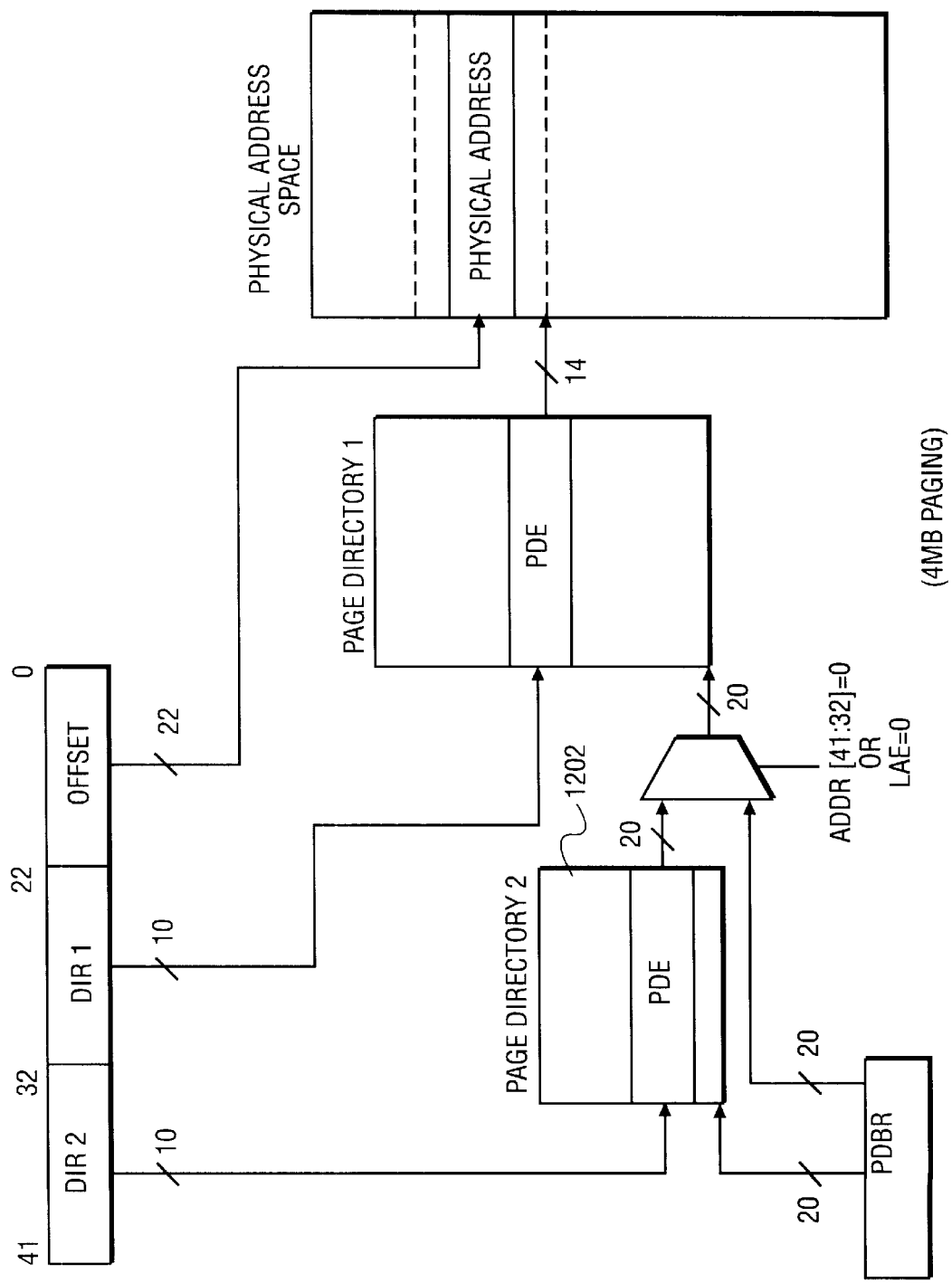
FIG. 12 provides an exemplary embodiment for translating a 42 bit linear address to a 36 bit physical address with 4-MByte paging and 4 byte entries.

An embodiment for extended linear address translation with 4 MB paging is shown in FIG. 12. Page directory 1202 provides an extra level of address translation, conditional upon whether extended linear addressing is indicated. Because of the page size, only two levels of page directories are utilized for translating an extended linear address to a physical address. Each page directory entry in FIG. 12 is 4 bytes, and the physical address space is 64-GBytes.

Figure 1:
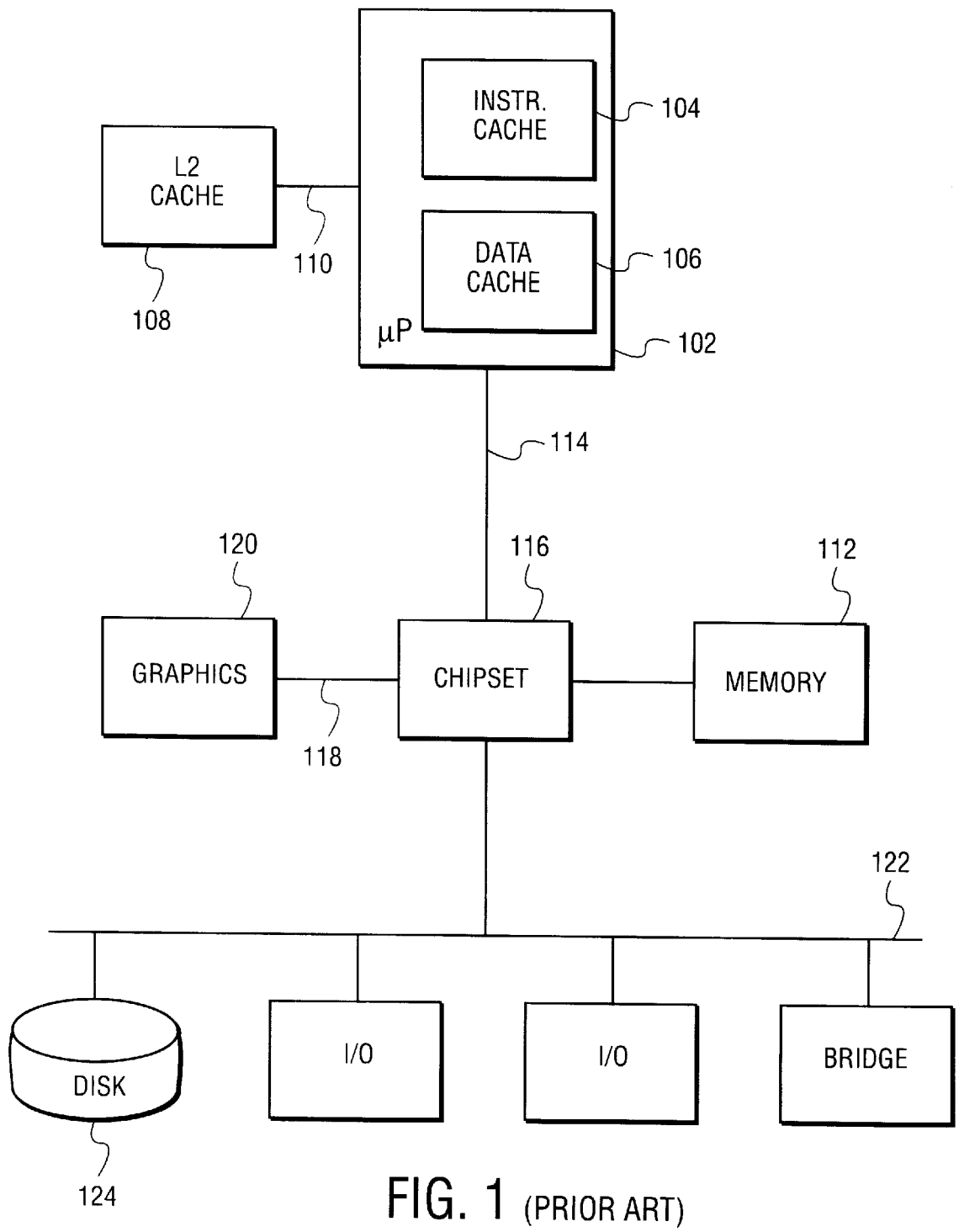
FIG. 1 provides a prior art diagram of a computer system.
Figure 2:
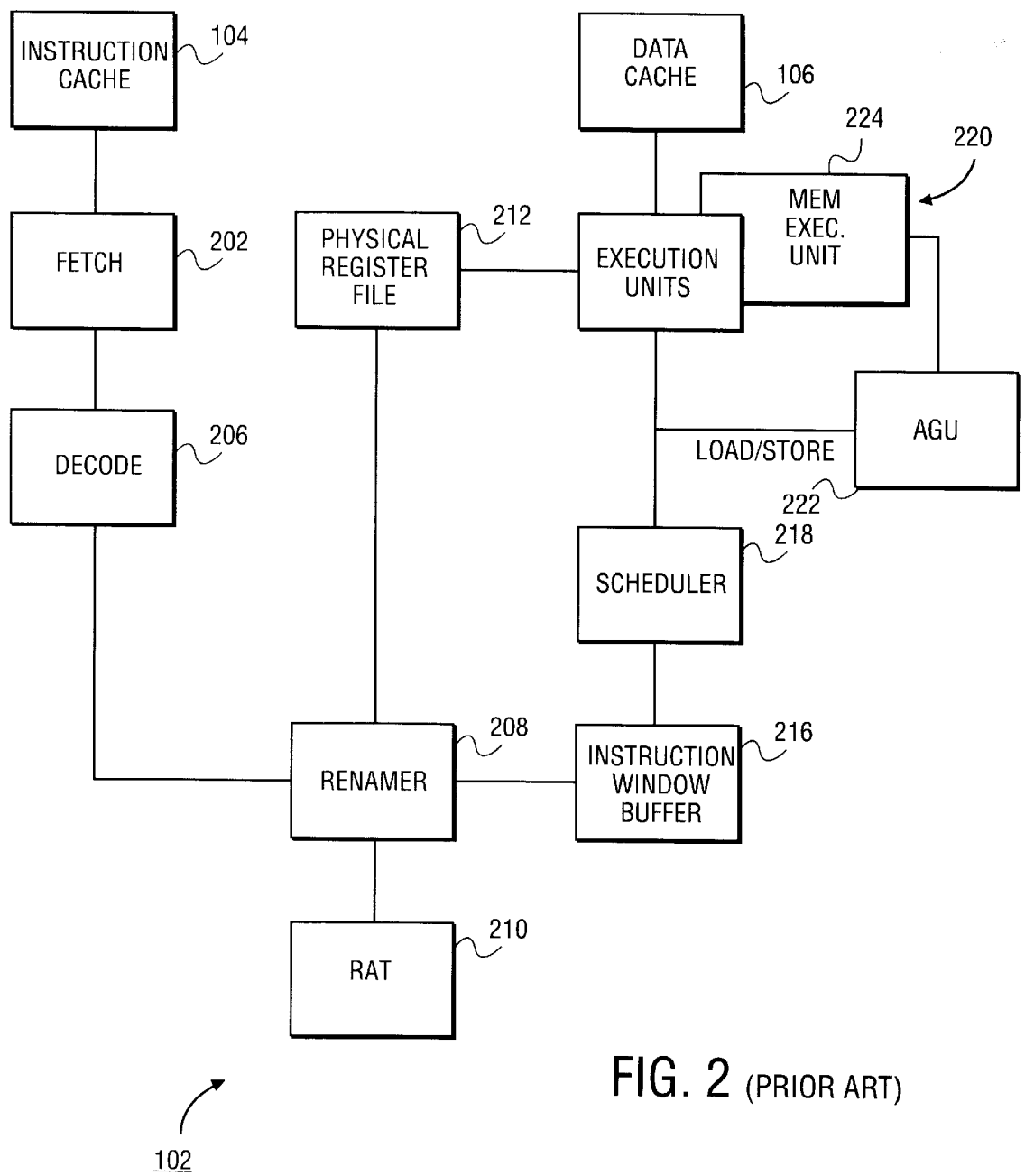
FIG. 2 provides a prior art diagram of a microprocessor.
Figure 3:
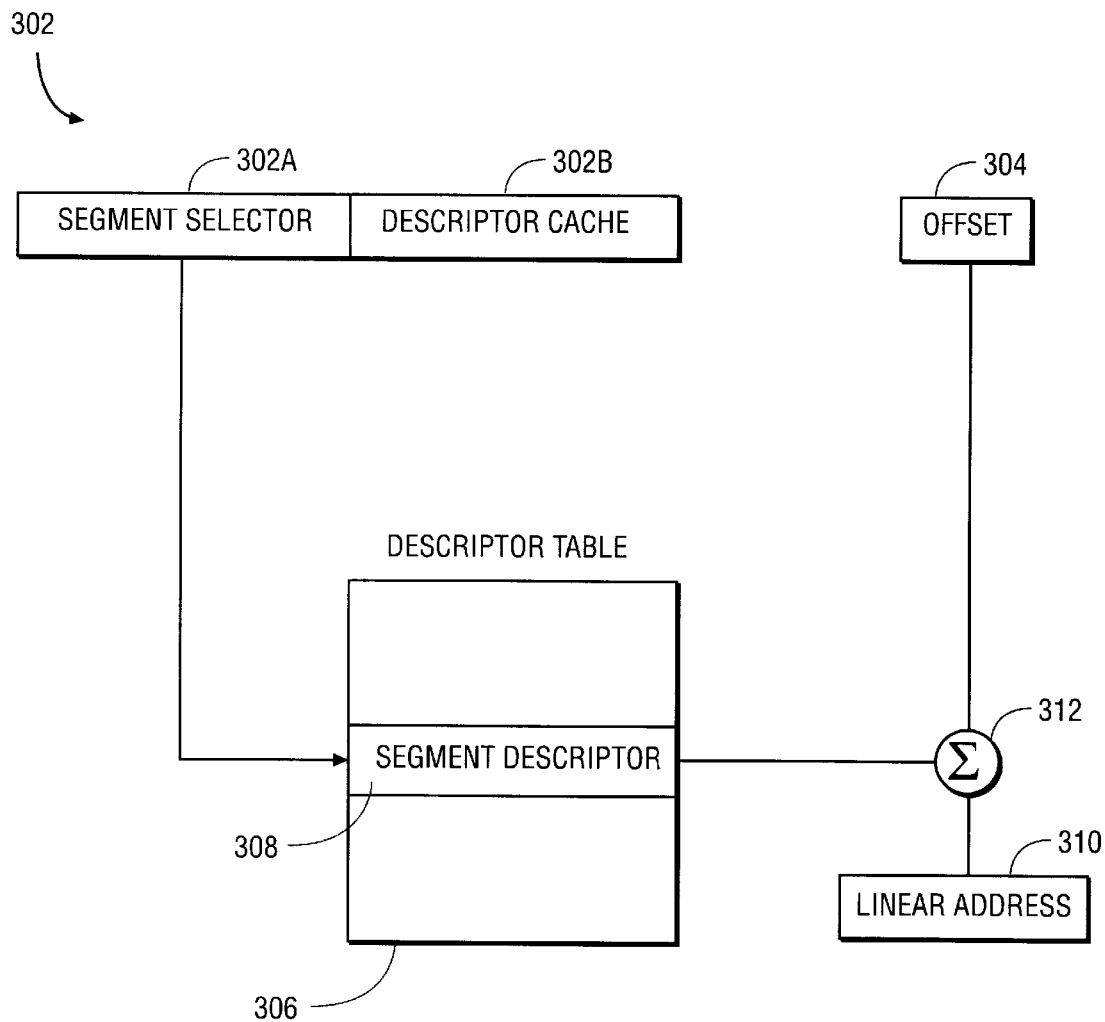
FIG. 3 provides a prior art illustration for translating a logical address to a linear address.
Figure 4:
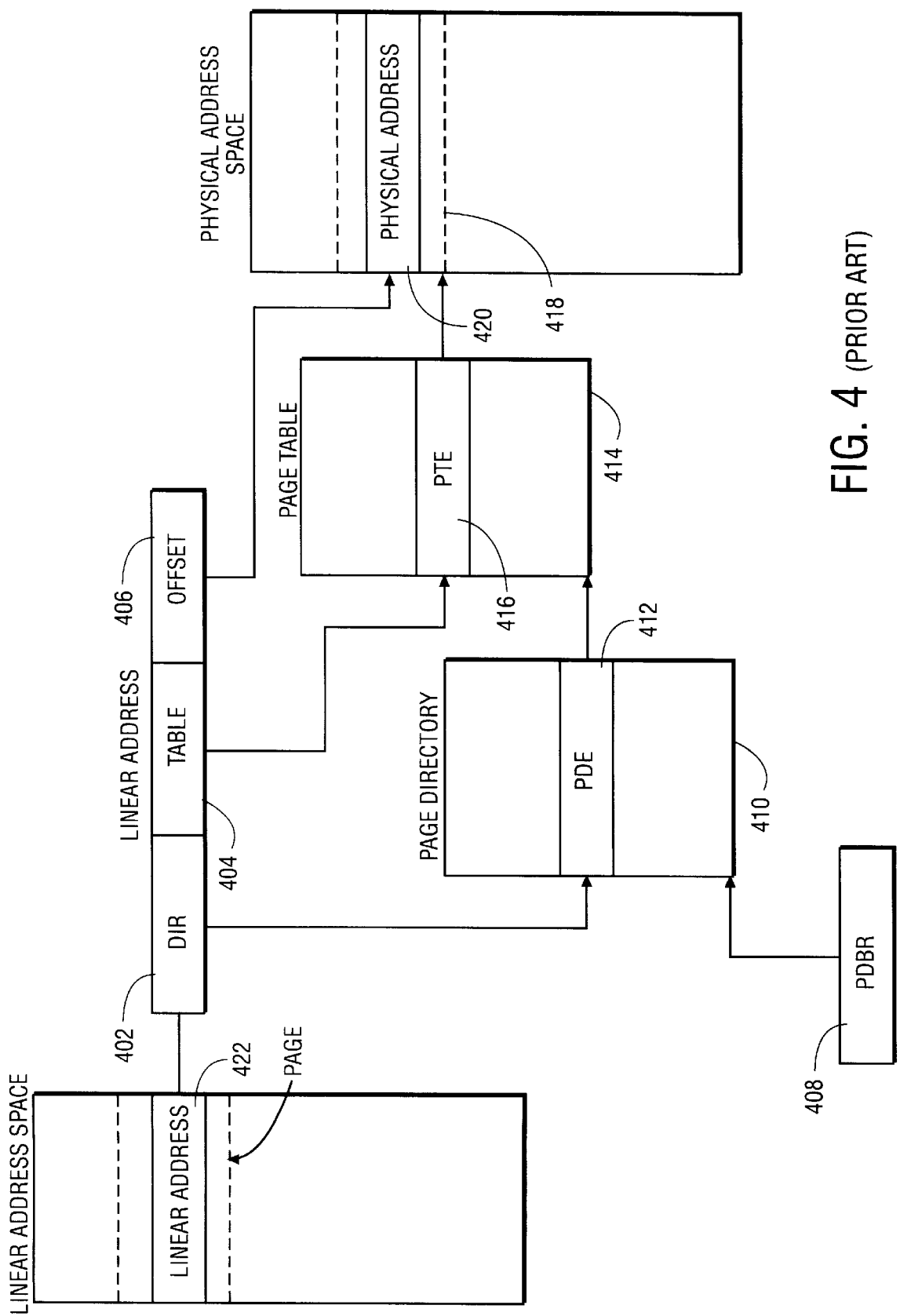
FIG. 4 provides a prior art illustration for translating a linear address to a physical address.
Figure 5:
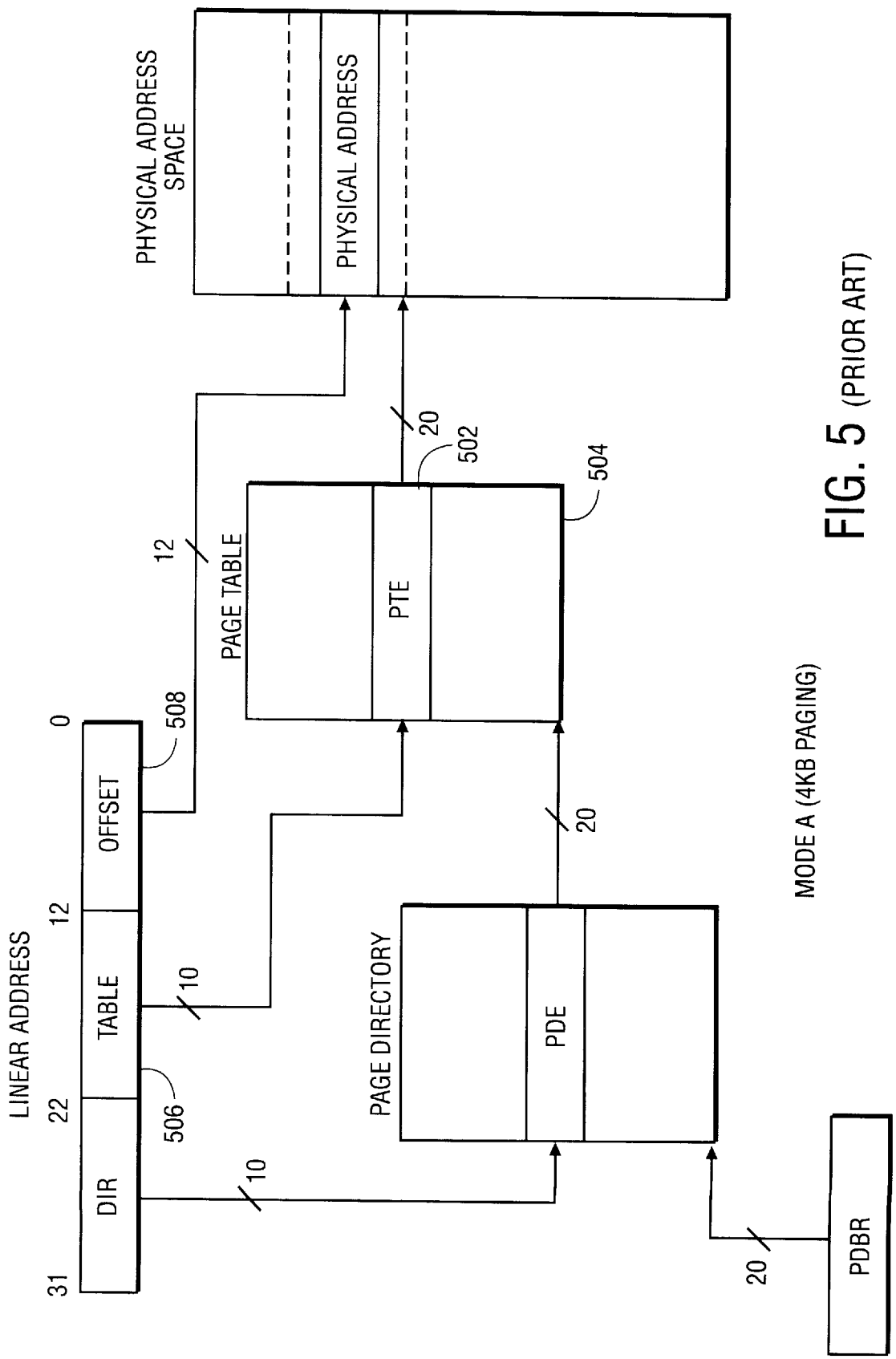
FIG. 5 provides a prior art illustration for translating a 32 bit linear address to a 32 bit physical address with 4-KByte paging.
Figure 6:
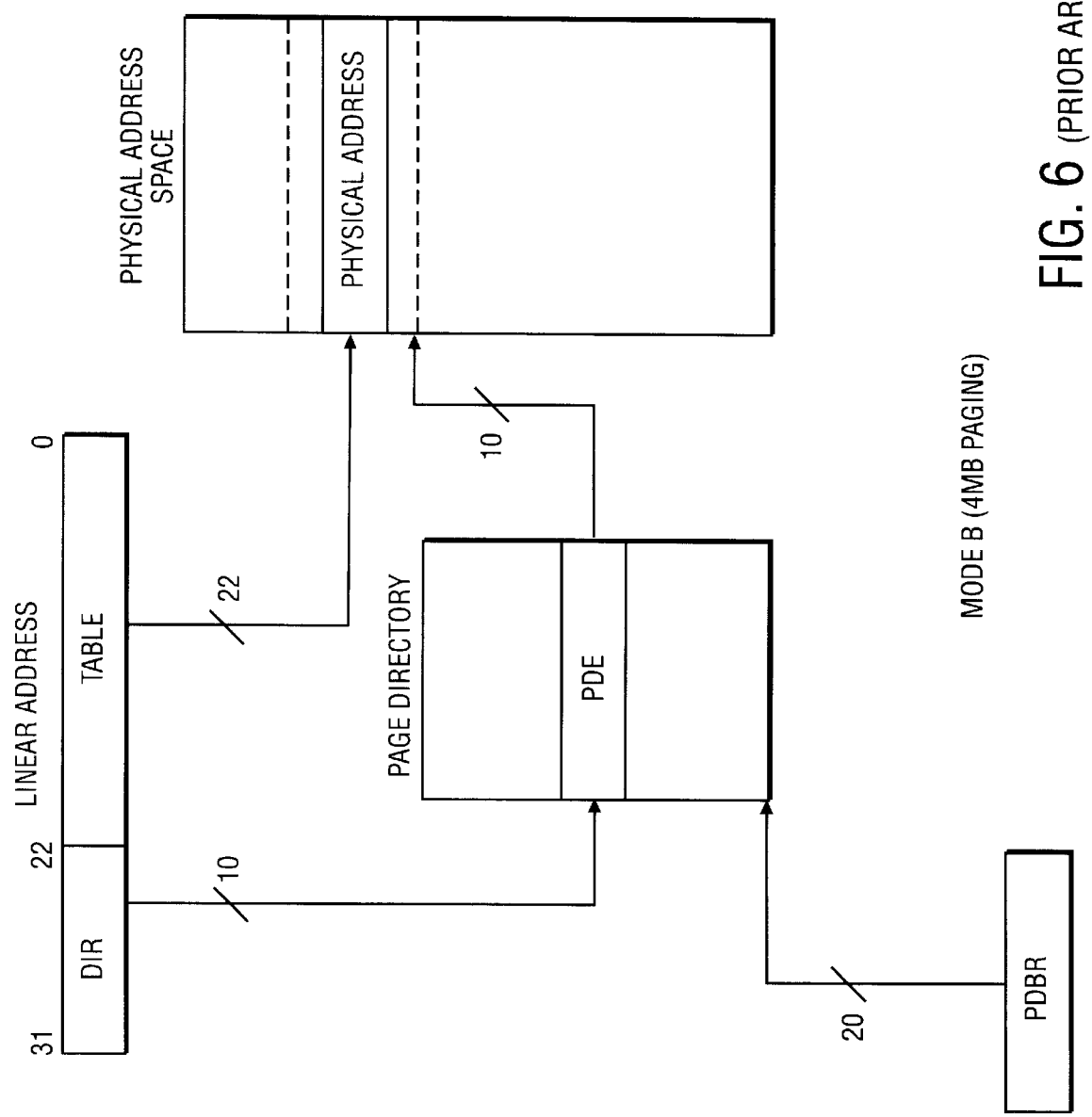
FIG. 6 provides a prior art illustration for translating a 32 bit linear address to a 32 bit physical address with 4-MByte paging.
Figure 7:
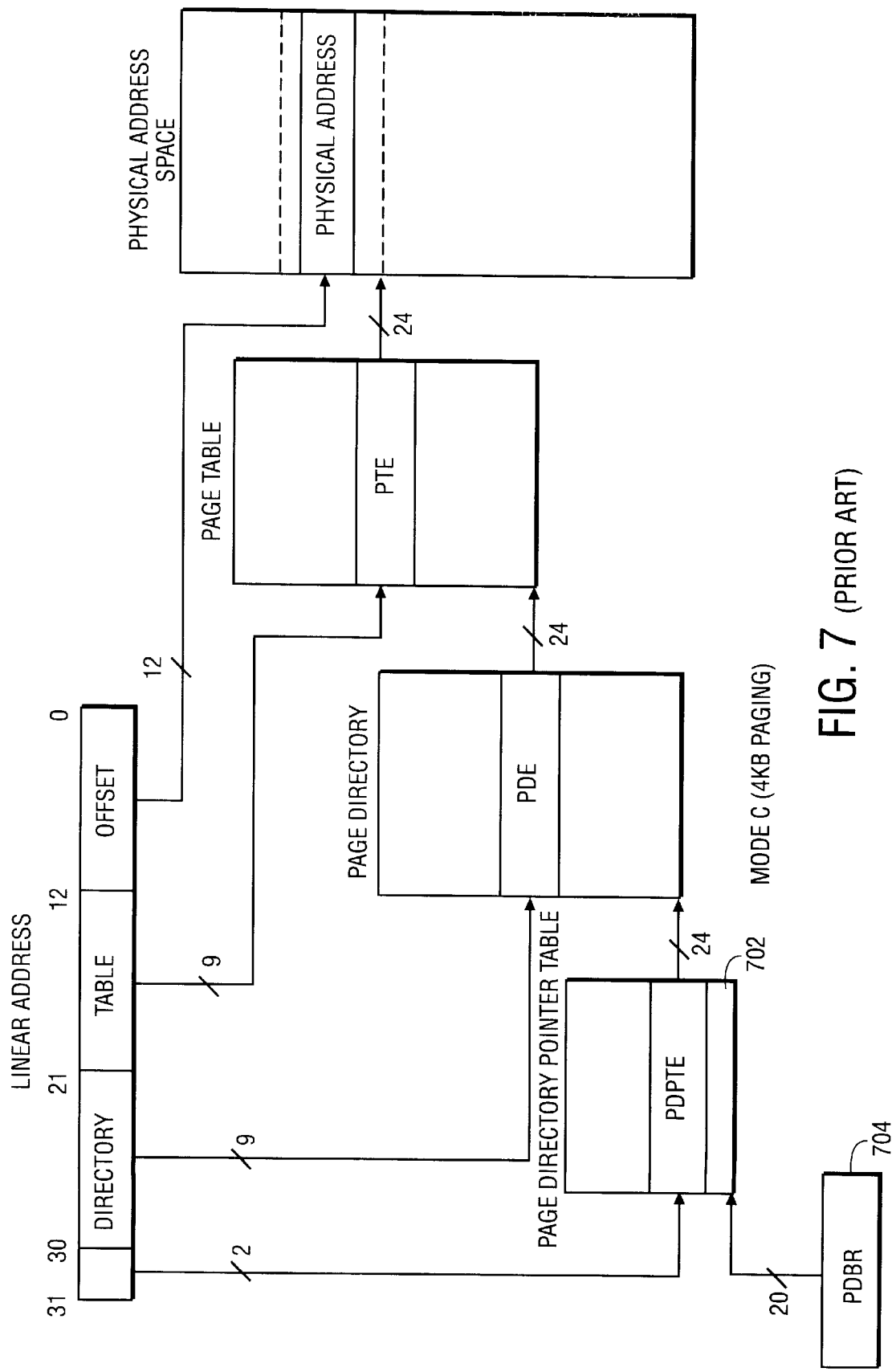
FIG. 7 provides a prior art illustration for translating a 32 bit linear address to a 36 bit physical address with 4-KByte paging.
Figure 8:
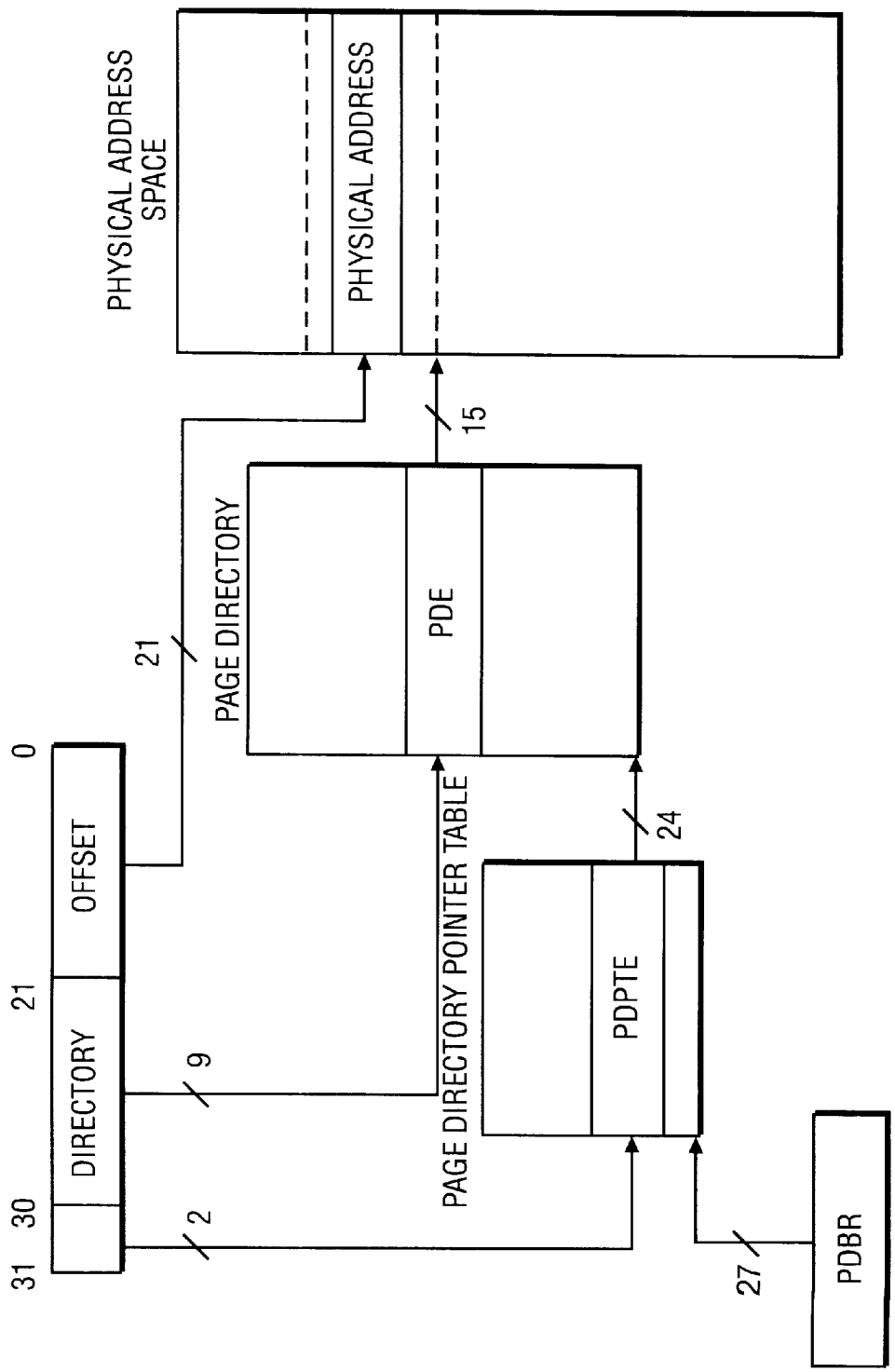
FIG. 8 provides a prior art illustration for translating a 32 bit linear address to a 36 bit physical address with 2-MByte paging.
Figure 13:
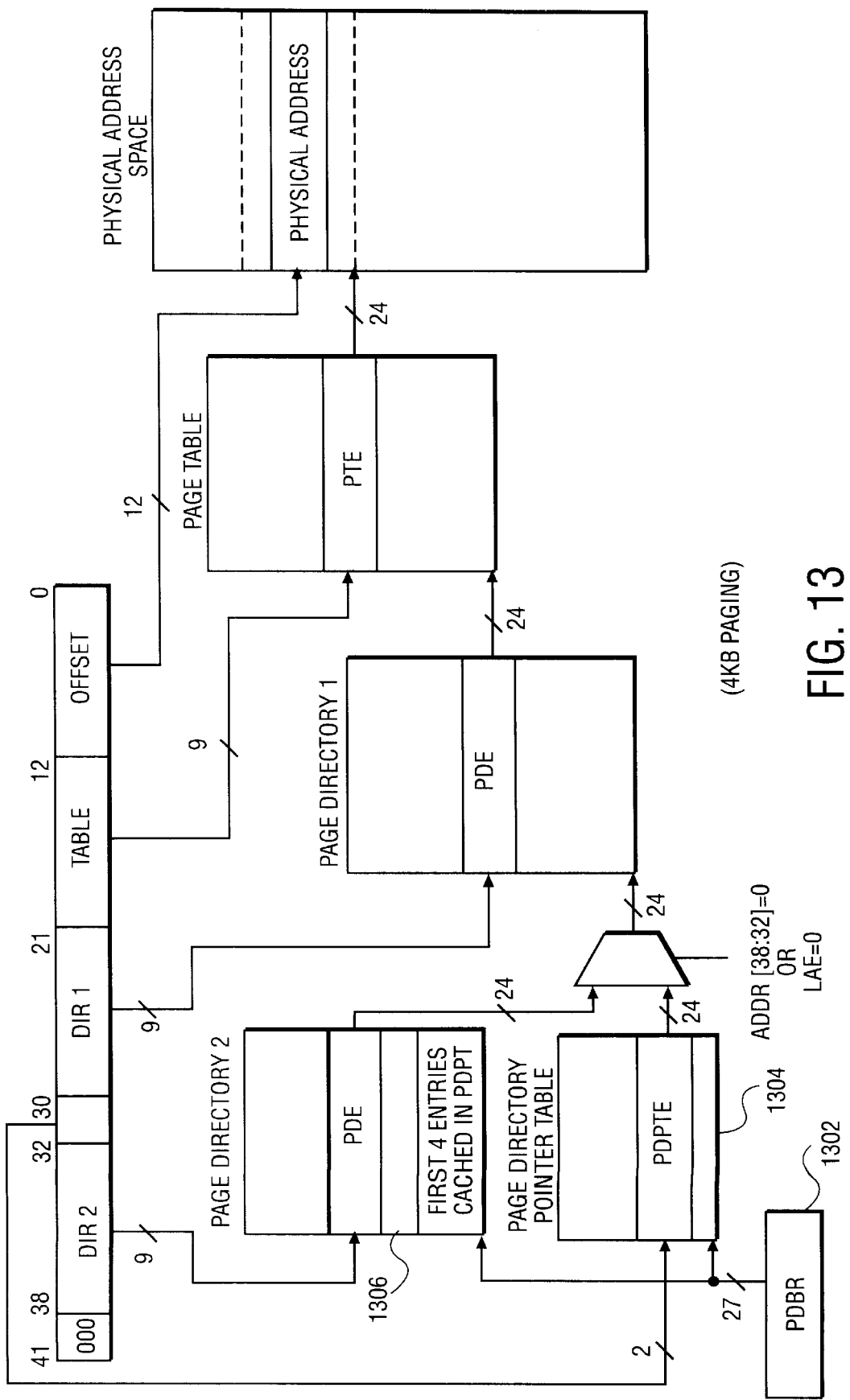
FIG. 13 provides an exemplary embodiment for translating a 42 bit linear address to a 36 bit physical address with 4-KByte paging and 8 byte entries.
Figure 14:
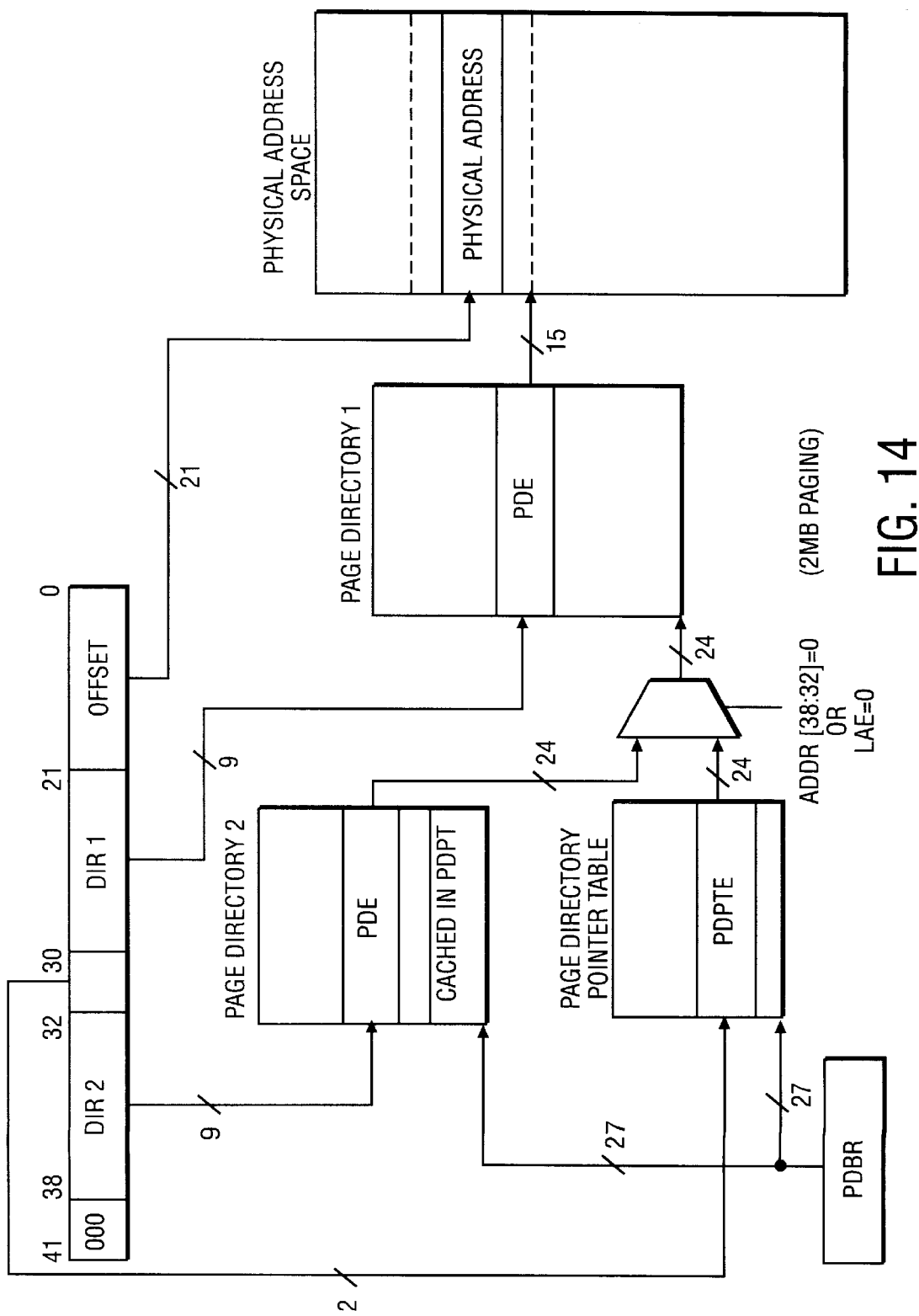
FIG. 14 provides an exemplary embodiment for translating a 42 bit linear address to a 36 bit physical address with 2-MByte paging and 8 byte entries.

An embodiment for extended linear address translation with 4 KB paging in an extended physical address space of 64-GBytes is shown in FIG. 13. As in mode C in FIG. 7, when extended linear address translation is not indicated, PDBR 1302 is used to point to the base address of PDPT 1304, which is usually kept in a cache. To support extended linear address translation, PDBR 1302 is used to point to the base address of page directory 1306, and bit positions 30 through 38 (Addr[38:30]) of the extended linear address provide the offset into page directory 1306. Note that the first four entries in page directory 1306 are also cached in PDPT 1304. For FIG. 13, directory and page table entries are each 8 bytes, and the number of entries in each directory and page is $2^9=512$ so that each directory and page is 4 KB in size. Because only 9 bits are used as an offset into page directory 1306, bits above position 38 in the linear address are not used in this embodiment. Consequently, if the linear address register is 42 bits, extended address translation is provided for 42 bit linear addresses with the highest three bits equal to zero. An embodiment for extended linear address translation with 2 MB paging in an extended physical address space of 64-GBytes is shown in FIG. 14, and should be self-explanatory. Entries in the page directories of FIG. 14 are 8 bytes, so that as in FIG. 13 the linear address bits above position 38 are zero.

Various modifications may be made to the disclosed embodiments without departing from the scope of the invention as claimed below.

What is claimed is:

1. A microprocessor having an extended linear address mode, the microprocessor comprising:
   a decoder to decode instructions so as to provide an offset;
   a segment register to store a segment selector and a segment extension; and
   an address generation unit to generate an extended linear address, wherein the extended linear address comprises the offset, the segment selector, and the segment extension;
   wherein during a page walk to translate the extended linear address to a physical address while in the extended linear address mode, the microprocessor utilizes a first pointer to reference a first table as a page directory; and while not in the extended linear address mode during the page walk the microprocessor utilizes a second pointer to reference a second table as the page directory.

2. The microprocessor as set forth in claim 1, wherein the extended linear address comprises a lower portion and an upper portion, wherein the address generation unit provides the lower portion as the sum of the offset and a base address, wherein the base address is provided by a segment descriptor from a descriptor table stored in memory and pointed to by the segment selector, wherein the upper portion is equal to the segment extension.

3. The microprocessor as set forth in claim 2, wherein the microprocessor is a 32 bit processor and the extended linear address has more than 32 bits.

4. The microprocessor as set forth in claim 1, wherein at least a portion of the segment extension stored in the segment register is used as an offset to point to an entry in a table, wherein the entry comprises the first pointer, wherein the second pointer is not a function of any portion of the segment extension.

5. A computer comprising:
   a system bus;
   memory coupled to the system bus; and
   a microprocessor coupled to the system bus, the microprocessor comprising
   a decoder to decode instructions so as to provide an offset;
   a segment register to store a segment selector and a segment extension; and
   an address generation unit to generate an extended linear address, wherein the extended linear address comprises the offset, the segment selector, and the segment extension;
   wherein during a page walk to translate the extended linear address to a physical address while in the extended linear address mode, the microprocessor utilizes a first pointer to reference a first table as a page directory; and while not in the extended linear address mode during the page walk the microprocessor utilizes a second pointer to reference a second table as the page directory.

6. The computer as set forth in claim 5, wherein the extended linear address comprises a lower portion and an upper portion, wherein the address generation unit provides the lower portion as the sum of the offset and a base address, wherein the base address is provided by a segment descriptor from a descriptor table stored in the memory and pointed to by the segment selector, wherein the upper portion is equal to the segment extension.

7. The computer as set forth in claim 5, wherein the microprocessor is a 32 bit processor and the extended linear address has more than 32 bits.

8. The microprocessor as set forth in claim 5, wherein at least a portion of the segment extension stored in the segment register is used as an offset to point to an entry in a table, wherein the entry comprises the first pointer, wherein the second pointer is not a function of any portion of the segment extension.

9. A microprocessor having an extended linear address mode, the microprocessor comprising:
   a register file;
   a decoder to decode instructions belonging to an instruction set, wherein the instruction set includes an instruction to specify an extended linear address, wherein the instruction to specify an extended linear address names a first source register in the register file and a second source register in the register file; and
   an address generation unit to generate an extended linear address as a concatenation of values stored in the first and second source registers;

wherein during a page walk to translate the extended linear address to a physical address while in the extended linear address mode, the microprocessor utilizes a first pointer to reference a first table as a page directory; and while not in the extended linear address mode during the page walk the microprocessor utilizes a second pointer to reference a second table as the page directory.

10. The microprocessor as set forth in claim 9, wherein the microprocessor is a 32 bit processor and the extended linear address has more than 32 bits.

11. The computer system as set forth in claim 9 wherein at least a portion of the segment extension stored in the segment register is used as an offset to point to an entry in a table, wherein the entry comprises the first pointer, wherein the second pointer is not a function of any portion of the segment extension.

12. A computer comprising:

a system bus;

memory coupled to the system bus; and a microprocessor coupled to the system bus, the microprocessor having an extended linear address mode, the microprocessor comprising a register file;

a decoder to decode instructions belonging to an instruction set, wherein the instruction set includes an instruction to specify an extended linear address, wherein the instruction to specify an extended linear address names a first source register in the register file and a second source register in the register file; and an address generation unit to generate an extended linear address as a concatenation of values stored in the first and second source registers;

wherein during a page walk to translate the extended linear address to a physical address while in the extended linear address mode, the microprocessor utilizes a first pointer to reference a first table as a page directory; and while not in the extended linear address mode during the page walk the microprocessor utilizes a second pointer to reference a second table as the page directory.

13. The computer as set forth in claim 12, wherein the microprocessor is a 32 bit processor and the extended linear address has more than 32 bits.

14. The computer system as set forth in claim 9, wherein at least a portion of the segment extension stored in the segment register is used as an offset to point to an entry in a table, wherein the entry comprises the first pointer, wherein the second pointer is not a function of any portion of the segment extension.

15. A method to perform a page walk, the method comprising:

selecting a first pointer to point to a first table in memory when in an extended linear address mode; and selecting a second pointer to point to a second table in memory when not in the extended linear address mode;

wherein the first table serves as a page directory when in the extended linear address mode and the second table serves as the page directory when not in the extended linear address mode.

16. The method as set forth in claim 15, wherein the first pointer is obtained as an offset into a table, wherein the offset is provided by at least a portion of a segment extension stored in a segment register, wherein the second pointer is not a function of any portion of the segment extension.

17. An article of manufacture comprising a computer readable memory, wherein stored in the computer readable memory are instructions that when executed by a computer cause the computer to:

select a first pointer to point to a first table in memory when the computer is in an extended linear address mode; and select a second pointer to point to a second table in memory when the computer is not in the extended linear address mode;

wherein the first table serves as a page directory when in the extended linear address mode and the second table serves as the page directory when not in the extended linear address mode.

18. The article of manufacture as set forth in claim 17, wherein the first pointer is obtained as an offset into a table, wherein the offset is provided by at least a portion of a segment extension stored in a segment register, wherein the second pointer is not a function of any portion of the segment extension.

* * * * *